UNITED STATES PATENT OFFICE.

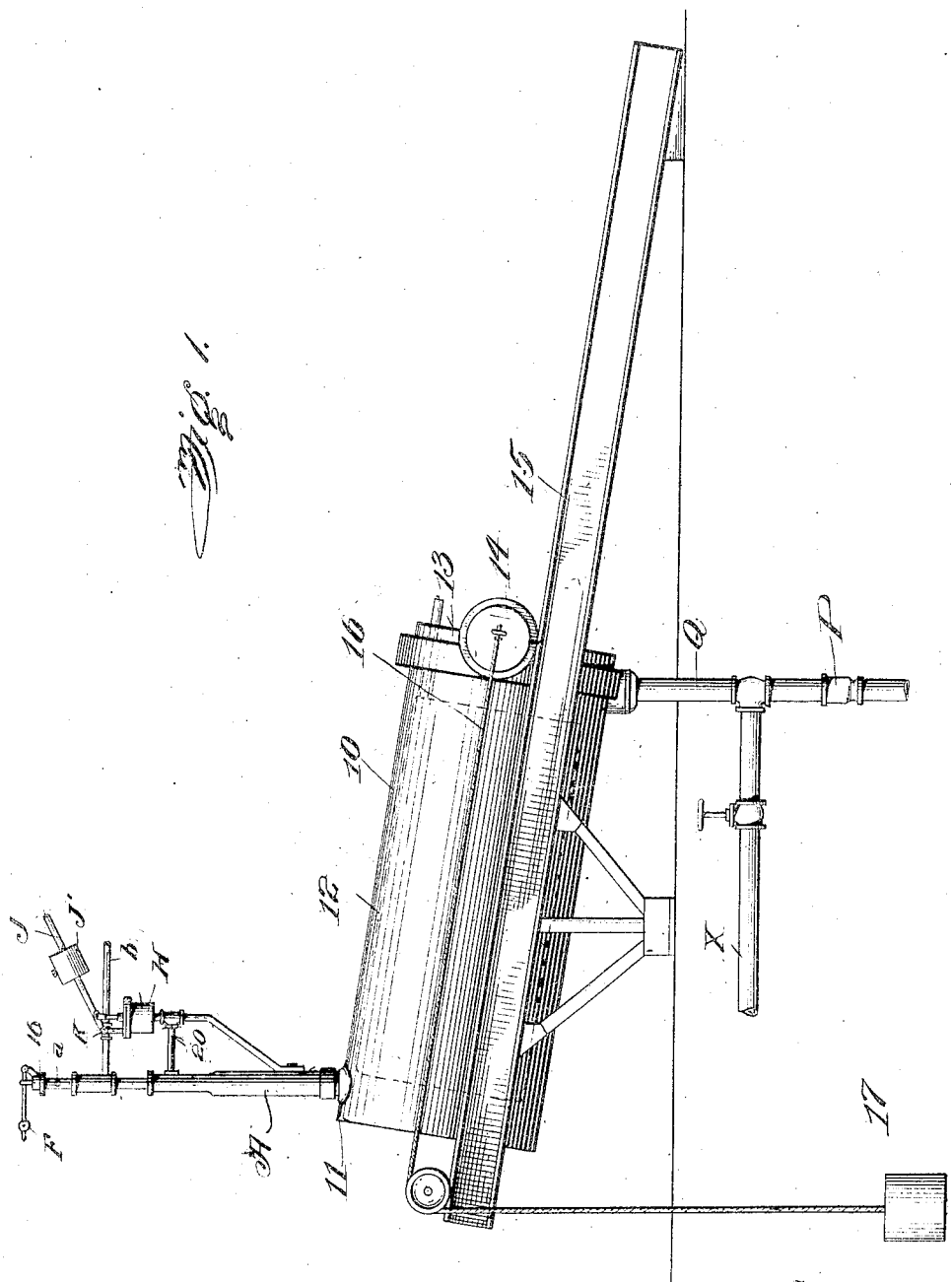

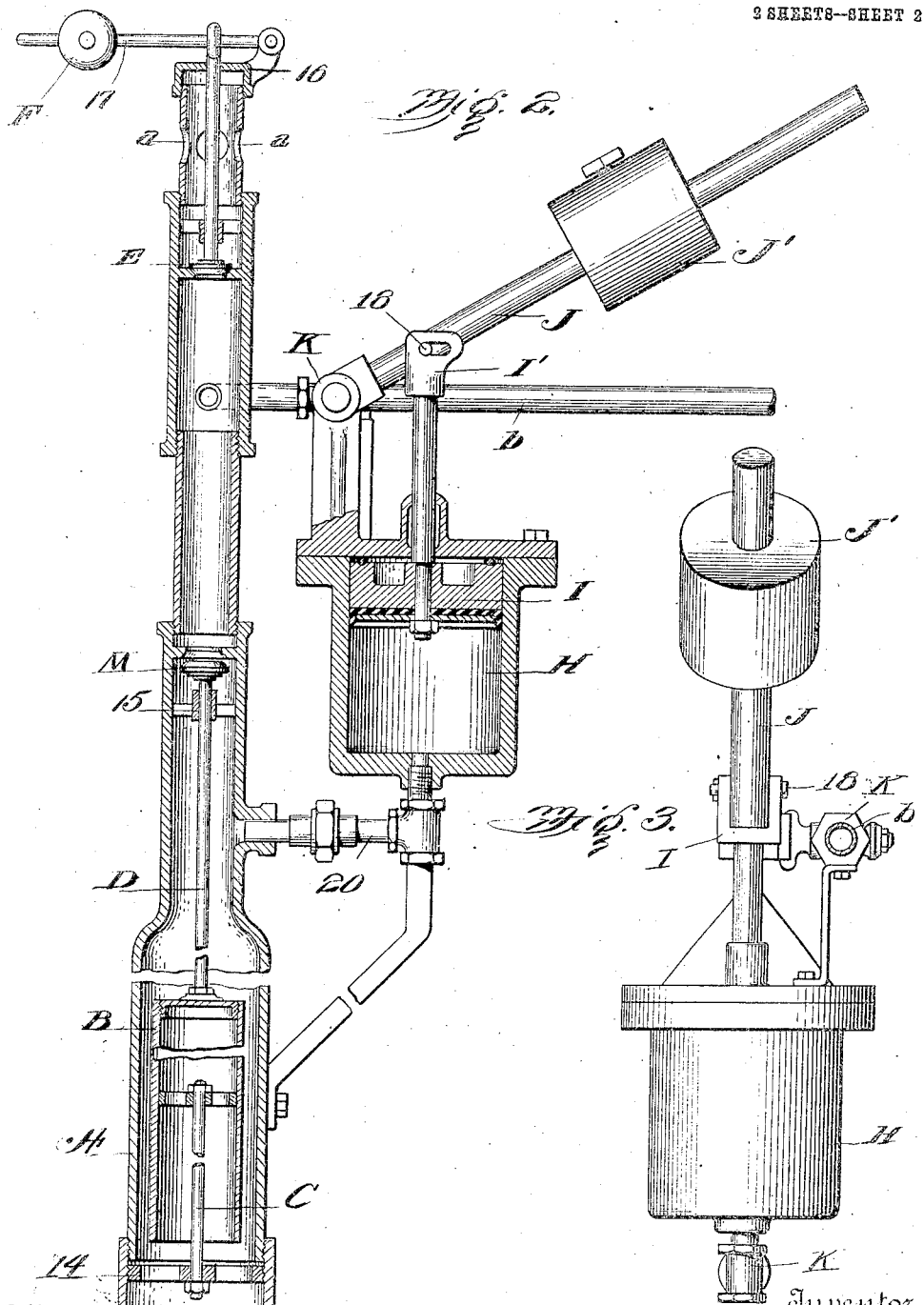

DAVID J. KELLY, OF SALT LAKE CITY, UTAH, ASSIGNOR TO KELLY FILTER PRESS COMPANY, OF SALT LAKE CITY, UTAH, A CORPORATION.

FILTERING APPARATUS.

957,467.  Specification of Letters Patent.  Patented May 10, 1910.

Application filed March 3, 1910. Serial No. 547,022.

*To all whom it may concern:*

Be it known that I, DAVID J. KELLY, a citizen of the United States, residing at Salt Lake City, in the county of Salt Lake and State of Utah, have invented certain new and useful Improvements in Filtering Apparatus, (Case A,) of which the following is a specification.

This invention relates to certain improvements in apparatus designed especially to separate slimes from which precious metals have been dissolved and the liquid which holds the precious metals in solution; while the invention is particularly useful for metallurgical work, I do not limit its use to this particular field of invention since the mechanism hereinafter described may be embodied in other types of apparatus and may, in fact, be employed in other fields and wherever the separation of solids from fluid matter is desired.

The essential object of my invention is to automatically govern the air exhaust and feed in filtering apparatus and to thereby relieve the operator of the necessity of manipulating valves by hand to insure proper conditions of air pressure at all times.

In the operation of many filters and particularly those of the type hereinafter mentioned, it is essential to close the air exhaust when the filter tank is full of slimes—pulp or wash solutions, or when it contains other matter to be separated by filtration, and also to supply air at proper pressure to displace surplus liquids and to hold the cakes of solid matter which accumulate on the surface of the filter, in place during the emptying of the tank in which the filter is contained.

With the above and other objects in view, my present invention consists of the parts, and the constructions, arrangements and combinations of parts, which I will hereinafter describe and claim.

In the accompanying drawings forming part of this specification and in which similar letters of reference indicate like parts in the several views, Figure 1 is a side elevation of a well known apparatus for separating or filtering slimes, embodying the present invention. Fig. 2 is an enlarged vertical sectional view of the air-governing means, showing parts in elevation. Fig. 3 is an end view of the air regulator.

In a prior patent granted to me March 13/06, No. 815,021, and in my former Patent No. 864,308, dated Aug. 27/07, I have disclosed a separating or filtering apparatus designed particularly for metallurgical work and for purposes of illustration I have employed this type of apparatus in the present drawing. The apparatus of the patents before named includes a closed tank, 10, preferably set at an incline and having a general cylindrical form although the cross-sectional character of the tank is immaterial. This tank has one of its ends, preferably the higher one, 11, permanently closed while the opposite or lower end is capable of being opened and closed for the purpose of introducing and removing suitable filter frames, 12, which are indicated by dotted lines in Fig. 1. The lower head, 13, of the tank may carry appropriate rollers or wheels, 14, at the sides designed to travel upon an inclined trackway, 15, and said head may be connected to a flexible connection, 16, and counter-weight, 17, in the manner fully shown and described in my aforesaid prior Patent No. 815,021.

Suitably attached to and extending above the upper and higher end of the tank, 10, is a vertical cylinder, A, in which is appropriately mounted a float, B, said float being closed at its upper end and being open at the bottom and being, preferably, of substantial vertical height. The lower end of the cylinder is in open connection with the upper rear end of the tank, 10, and said cylinder carries a spider or ring, 14, to which is fixed a vertical rod, C, which forms a guide for the float in its rising and falling movements.

Fixed to the upper closed end of the float is a rod, D, which projects through an appropriate guide, 15, in the upper portion of the cylinder and carries upon its upper end a valve, M, which seats upwardly against an appropriate valve seat formed in the cylinder to thereby open and close communication between the upper and lower portions of the cylinder, as I will hereinafter describe.

Within the upper portion of the cylinder above the valve, M, is a downwardly closing puppet-valve, E, the stem of which extends through a cap, 16, on the upper end of the cylinder and engages a lever, 17, one end of which is pivotally connected to the cap or to some suitable stationary point while the opposite portion carries a weight, F, which is adjustable along the lever in any well known manner, said weight serving as a counterbalance to return the puppet-valve to its seat after it has been raised by pressure within the cylinder as I will presently describe.

The upper end of the cylinder is also provided with suitable perforations, a, for the escape of air which has passed the puppet-valve.

Suitably supported upon the cylinder at one side thereof, is a dash-pot which consists of a cylindrical or other vessel, H, in which operates a piston, I, having a projecting stem, I', the upper end of which may be provided with a slot as shown. The stem of the dash-pot is connected by a pin, 18, or other means with a lever, J, one end of which is connected with the stem, of a suitable valve, K, located in the pipe, b, which supplies and regulates the air-feed to the tank, 10, said lever, J, being provided with a weight, J', which is adjustable on the lever so as to control the opening of the valve, K, and thereby supply any desired air pressure to the tank.

The lower end of the filter tank, 10, is connected with the feed line pipe, Q, by which the material is supplied to the tank and which pipe connects with a compressed air or other pressure delivery pipe, X, in much the same way as disclosed in my aforesaid Patent No. 815,021, but it is obvious that the arrangement of the feed of material to the tank may depart from that disclosed in the prior patent and as herein shown without affecting the operation of the air-governing devices, which form the essential part of the present invention.

The cylinder, A, being secured to the tank at the highest point of the latter, it will be manifest that as the tank fills with slimes, pulp or other material to be separated the air which accumulates in the upper portion of the tank is displaced and enters the cylinder, A, and passes through the same past the valve, M, and the puppet-valve, E, and passes out through the perforations or openings in the upper portion of the cylinder above said puppet-valve, the float, B, being normally in a lowered position and the valve, M, carried by the float being withdrawn from its valve seat to permit the air to escape thereabout and lift the puppet-valve.

When the tank becomes full of the material to be separated, the float, B, is caused to rise and to thereby seat the valve, M, so as to cut off communication between the cylinder and the atmosphere, and the hydraulic pressure in the filter tank, 10, compresses the air in the cylinder, A, and this compressed air is delivered through a pipe, 20, into the dash-pot below the piston thereof with the result that this piston is caused to move upwardly at the same time lifting the counterweight lever, J, and closing the valve, K, and thereby shutting off communication through the air pipe, b, and which pipe is provided with an air valve, N, as shown in Fig. 1 and which is now opened and remains in an open condition until the tank is opened to discharge the accumulated cakes, the valve, K, now regulating the air feed.

If the hydraulic pressure is reduced after the tank, 10, is full of material, the pressure in the tank falls when the weighted lever, J, acts upon the stem of the piston, I, to thereby force the piston down, because of the diminished pressure in the cylinder, A, and to open the air controlling valve, K; this reduction in pressure also causes the float to drop so that its valve, M, will be moved from its valve seat. On the pipe line, Q, is a check valve, P, which prevents the liquid from running out of the tank. The compressed air entering the tank creates a back pressure on the piston, I, of the dash-pot, which, when strong enough to overcome the weight upon the lever, J, lifts this lever and again closes the air regulating valve, K. By the means described, a constant air pressure is maintained in the tank in which the filtering operation occurs, and any desired air pressure may be supplied to the tank by proper adjustment of the weight on the lever, J.

The weight on the stem of the puppet-valve is made sufficient to prevent this valve from blowing off or lifting from its seat until the pressure in the tank is slightly more than is needed to lift the piston of the dash-pot and thereby close the air regulating valve, K. When the hydraulic pressure is restored, the check valve, P, is opened and the accumulated air in the filter tank, 10, escapes through the puppet-valve as herein described; when the tank is again full the float acts to close the valve, M, and cause the accumulated pressure in the cylinder to actuate the dash-pot and regulate the position of the valve, K. In the same manner air is supplied to the filter tank when the valve, X, is opened to drain the tank of surplus unfiltered slimes pulp or surplus wash liquors, and the solid material which cakes upon the sides of the filter in the manner described in my former patents is held in place, and air is exhausted at a given pressure when the tank is filling.

From the above description it will be apparent that the present invention automatically exhausts displaced air at desired pressure when the filter tank is filling with a liquid; that it automaitcally closes the exhaust valve when the tank is full, and that it automatically supplies air at any required pressure to the tank when the hydraulic pressure in the tank ceases, thereby reducing the manual labor heretofore required for such purposes and insuring against poor manipulation and its consequences.

Having thus described my invention what I claim as new and desire to obtain by Letters Patent is:

1. The combination with a hydraulic filtering apparatus, of a container connecting therewith and through which air displaced in filling the apparatus is normally permitted to escape and means controlled by the hydraulic pressure in the apparatus for admitting a pressure into the apparatus to supplement the hydraulic pressure.

2. The combination with a filter tank of means connecting therewith and automatically exhausting displaced air when the tank is filling, and means for automatically supplying air under pressure to the tank to maintain substantially a uniform pressure therein when the hydraulic pressure in the tank becomes reduced.

3. The combination with a filter tank, of means connecting therewith and normally automatically exhausting displaced air when the tank is filling, and means for maintaining substantially a uniform pressure in the tank after the latter is filled, said last-named means being controlled by the tank pressure, and adapted to admit an auxiliary pressure to the tank when the hydraulic pressure in the tank decreases.

4. A filter tank adapted to receive liquid matter under pressure, said tank having means for automatically exhausting displaced air when the tank is filling and having also, a mechanism for automatically supplying compressed-air to the tank in response to a deficient hydraulic pressure.

5. A hydraulic filtering apparatus comprising a tank to receive liquid, said tank having means for exhausting displaced air when the tank is filling; an auxiliary fluid-pressure mechanism connecting with the tank and including a fluid-pressure conductor and a valve controlling the admission of the fluid-pressure to the tank; and means for automatically imparting an opening and closing movement to the valve in response to variations in the tank pressure.

6. A filtering apparatus comprising a tank into which liquid is admitted under pressure, means for exhausting displaced air when the tank is filling, said means including a displaced-air receiver connecting with the tank and a valve controlling the passage of the air through the receiver; means within the receiver and actuated by the hydraulic pressure in the tank for cutting off the escape of the displaced air from the receiver, and compressing said air; a compressed air feed pipe connecting with said receiver having a controlling valve, and means connecting with the receiver and actuated by the hydraulic pressure in the tank for opening the valve in the air-feed pipe in response to a reduction in the tank pressure.

7. The combination with a filter tank and a compressed-air feed line connecting therewith, of a means in said feed line for automatically exhausting displaced air when the tank is filling with a liquid; means for closing the exhaust and thereby placing the confined displaced air under compression; and means actuated by the hydraulic pressure in the tank for reducing or cutting off the feed of compressed air through the feed line into the tank by increase of hydraulic pressure in the tank, said last-named means operating to restore the feed of compressed-air in response to a reduction of pressure in the tank whereby the pressure in the tank is substantially uniformly maintained.

8. The combination with a filter tank, of a vertically disposed cylinder connecting therewith having an escape valve in its discharge portion, an auxiliary compressed air pipe connecting with said cylinder, said pipe having a controlling valve, a float within the cylinder actuated by hydraulic pressure in the tank and having a valve for closing the passage of air through said cylinder, whereby displaced air is placed under compression in the cylinder, and a dash-pot connecting with the cylinder and actuated by the compressed displaced air for actuating the valve in the auxiliary air pipe by variations of the hydraulic pressure in the tank.

9. The combination with a filter tank, of a cylinder having one end connecting therewith and having another portion provided with a valve for the escape of the air displaced when the tank is filling, a float within the cylinder having a valve adapted to seat in the cylinder and close the passage for the displaced air, a dash-pot connecting with the cylinder, an auxiliary compressed-air pipe connecting with said cylinder and having a regulable valve, and a lever on the valve and connected to the movable member of the dash-pot, said float adapted to be actuated by the hydraulic pressure in the tank when said tank is filled to prevent the passage of displaced air through the cylinder whereby said air becomes compressed and actuates the dash-pot to reduce or cut off the supply of auxiliary compressed-air, said dash-pot operating to open said valve to admit an auxiliary air pressure into the tank when the hydraulic pressure of the tank becomes reduced.

10. The combination with a filter tank, of a cylinder connecting therewith and forming a passage for the air displaced when the tank is filled, said cylinder having an upwardly opening valve in its outer portion and having an internal valve-seat in an intermediate portion of the cylinder, a float operable in the cylinder and exposed to the hydraulic pressure in the cylinder, said float having a stem with a valve thereon adapted to seat upwardly against said valve-seat, said valve being normally open to permit the escape of displaced air and adapted to be closed by the rise of the float when the tank is filled and the float is subjected to the hydraulic pressure in the tank, a dash-pot connecting with the tank and receiving compressed displaced air, said dash-pot having a piston portion with an extending stem, an auxiliary compressed-air pipe connecting with the cylinder, a valve in said pipe for regulating the admission of the compressed-air into the cylinder, a lever connected to the valve and also to the stem of the dash-pot whereby the valve is maintained closed by the hydraulic pressure in the tank, and a weight on the lever operating to retract the piston of the dash-pot and open the valve in the air pipe coördinately with the reduction of hydraulic pressure in the filter tank.

11. The combination with a filter tank, of a cylinder connecting with the upper portion thereof, said cylinder having a fixed internal guide, a counterweighted puppet-valve at the upper end of the cylinder adapted to open upwardly under the influence of air displaced when the tank is filled with liquid, a hollow float within the cylinder and inclosing said guide, said float being open at its bottom and having a rigid stem extending from its top, a valve on said stem adapted to close upwardly, an auxiliary compressed-air pipe connecting with the cylinder, a dash-pot also connecting with the cylinder below the second-named valve, said dash-pot having a piston portion with an extended stem and said float being actuated by the hydraulic pressure in the tank when the tank is filled to cut off the escape of displaced air from the cylinder whereby said air is compressed in the cylinder and enters the dash-pot to move the piston thereof, a valve in the auxiliary air pipe adapted to be held in a closed position by hydraulic pressure in the tank, and means for opening said valve and admitting compressed-air into the cylinder coördinately with the reduction of hydraulic pressure in the tank.

In testimony whereof I affix my signature in presence of two witnesses.

DAVID J. KELLY.

Witnesses:
ALBERT L. GENTER,
C. B. FELT.